US009500898B2

(12) United States Patent
Kim et al.

(10) Patent No.: US 9,500,898 B2
(45) Date of Patent: Nov. 22, 2016

(54) LIQUID CRYSTAL DISPLAY

(71) Applicant: Samsung Display Co., Ltd., Yongin, Gyeonggi-Do (KR)

(72) Inventors: Yoon-Jang Kim, Suwon-si (KR); Dong-Gyu Kim, Yongin-si (KR); Eun Cho, Cheonan-si (KR); Yeong-Keun Kwon, Suwon-si (KR); Kee-Bum Park, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 342 days.

(21) Appl. No.: 13/923,075

(22) Filed: Jun. 20, 2013

(65) Prior Publication Data

US 2013/0278874 A1 Oct. 24, 2013

Related U.S. Application Data

(62) Division of application No. 12/435,309, filed on May 4, 2009, now Pat. No. 8,477,253.

(30) Foreign Application Priority Data

Dec. 9, 2008 (KR) .................. 10-2008-0124676

(51) Int. Cl.
*G02F 1/1335* (2006.01)
*G02F 1/1343* (2006.01)
*G02F 1/1362* (2006.01)
*G02F 1/136* (2006.01)

(52) U.S. Cl.
CPC ..... *G02F 1/133514* (2013.01); *G02F 1/13624* (2013.01); *G02F 1/134363* (2013.01); *G02F 1/136213* (2013.01); *G02F 2001/13606* (2013.01); *G02F 2001/136222* (2013.01)

(58) Field of Classification Search
CPC ............... G02F 1/133514; G02F 1/133615; G02F 1/136213; G02F 1/13624; G02F 2001/13606; G02F 2001/136222; G02F 1/134363
USPC ............................................. 349/48
See application file for complete search history.

(56) References Cited

U.S. PATENT DOCUMENTS

| 5,299,041 | A | 3/1994 | Morin et al. |
| 7,394,510 | B2 | 7/2008 | Oh et al. |
| 2004/0001170 | A1 | 1/2004 | Chang et al. |
| 2007/0064164 | A1* | 3/2007 | Tasaka ............... H01L 27/1255 349/38 |
| 2008/0030640 | A1 | 2/2008 | Hur et al. |
| 2008/0106664 | A1 | 5/2008 | Lin |
| 2008/0122772 | A1 | 5/2008 | Takeuchi et al. |

(Continued)

FOREIGN PATENT DOCUMENTS

| JP | 2000-019559 | 1/2000 |
| JP | 2003-186451 | 7/2003 |
| JP | 2005-062882 | 3/2005 |

(Continued)

*Primary Examiner* — Charles Chang
(74) *Attorney, Agent, or Firm* — Innovation Counsel LLP

(57) ABSTRACT

A liquid crystal display according to an embodiment of the present invention includes: a first substrate; a plurality of color filters formed on the first substrate and arranged in a matrix with an island shape; a plurality of pixel electrodes formed on the color filters; and a capacitor disposed between neighboring color filters in a column direction among the color filters, wherein two terminals forming the capacitor are disposed at a portion outside a position overlapping the color filters.

11 Claims, 7 Drawing Sheets

(56) References Cited

U.S. PATENT DOCUMENTS

2008/0158455 A1* 7/2008 Yoo .................. G02F 1/136213
349/38
2008/0218065 A1 9/2008 Ishihara et al.

FOREIGN PATENT DOCUMENTS

| | | |
|---|---|---|
| JP | 2008-009360 | 1/2008 |
| KR | 10-2004-0001695 | 1/2004 |
| KR | 10-2007-0029899 | 3/2007 |
| KR | 10-2008-0010987 | 1/2008 |
| KR | 10-2008-0034545 | 4/2008 |
| KR | 10-2008-0042338 | 5/2008 |
| KR | 10-2008-0051356 | 6/2008 |
| KR | 10-2008-0064055 | 7/2008 |
| KR | 10-2008-0100027 | 11/2008 |

* cited by examiner

LIQUID CRYSTAL DISPLAY

CROSS-REFERENCE TO RELATED APPLICATIONS

This application is a continuation of U.S. patent application Ser. No. 12/435,309 filed on May 4, 2009, which claims priority to and the benefit of Korean Patent Application No. 10-2008-0124676 filed in the Korean Intellectual Property Office on Dec. 9, 2008, the entire contents of which are incorporated herein by reference.

BACKGROUND

Technical Field

The present invention generally relates to a liquid crystal display.

Related Art

A liquid crystal display (hereinafter referred to as an LCD) is one of the most widely used flat panel displays. The typical LCD includes two display panels provided with electric field generating electrodes, such as pixel electrodes and a common electrode, and a liquid crystal layer interposed between the two display panels. In the LCD, voltages are applied to the electric field generating electrodes to generate an electric field in the liquid crystal layer. Due to the generated electric field, liquid crystal molecules of the liquid crystal layer are aligned and polarization of incident light is controlled, thereby displaying images. The LCD also includes switching elements connected to the respective pixel electrodes, and a plurality of signal lines such as gate lines and data lines for controlling the switching elements and applying voltages to the pixel electrodes. The liquid crystal display also includes color filters made of an organic material including pigments for realizing colors.

When the pixel electrodes and the color filters are formed on the different display panels, it is difficult to correctly align the pixel electrodes and the color filters, and an alignment error may be generated. To solve this problem, a color filter on array (CoA) structure in which the pixel electrodes and the color filters are formed on the same display panel is provided. In the color filter on array structure, the color filters, the pixel electrodes, a plurality of signal lines for applying the voltage to the pixel electrodes such as gate lines and data lines, and switching elements for driving them are formed on one display panel.

Among the LCDs, a vertical alignment (VA) mode LCD, which aligns liquid crystal (LC) molecules such that the long axes of the LC molecules are perpendicular to the panels in the absence of an electric field, is favored because of its high contrast ratio and wide reference viewing angle. In this case, the reference viewing angle refers to a viewing angle at which a contrast ratio is 1:10 or to a luminance inversion limit angle between grays (e.g., an angle at which gray-scale inversion begins to occur).

In order to cause side visibility to approximate front visibility in the vertical alignment mode LCD, a method of causing a difference in transmittance by dividing one pixel into two subpixels and applying different voltages to the two subpixels has been suggested.

The above information disclosed in this Background section is only for enhancement of understanding of the background of the invention and therefore it may contain information that does not form the prior art that is already known in this country to a person of ordinary skill in the art.

SUMMARY

Embodiments of the present invention generally may prevent a process deviation generated at each pixel when forming a color filter, may increase the aperture ratio of a liquid crystal display, and may reduce parasitic capacitance generated between a pixel electrode and a gate line, thereby minimizing a kickback voltage.

A liquid crystal display according to an embodiment of the present invention includes: a first substrate; a plurality of color filters formed with an island shape on the first substrate and arranged in a matrix; a plurality of pixel electrodes formed on the color filters; and a capacitor disposed between neighboring color filters in a column direction among the color filters, wherein two terminals forming the capacitor are disposed at a portion outside a position overlapping the color filters.

Each pixel electrode may include a first subpixel electrode and a second subpixel electrode, and a plurality of first thin film transistors connected to the first subpixel electrodes, a plurality of second thin film transistors connected to the second subpixel electrodes, a plurality of third thin film transistors connected to the second subpixel electrodes, a plurality of first gate lines connected to the first and second thin film transistors, a plurality of data lines connected to the first and second thin film transistors, and a plurality of second gate lines connected to the third thin film transistors may be further included. The first and second gate lines may be disposed between the neighboring color filters in the column direction among the color filters. The first and second gate lines may be disposed outside a portion overlapping the pixel electrodes. The capacitor may be connected to the second subpixel electrode through the third thin film transistor. The third thin film transistor may be connected to the second subpixel electrode through a contact hole. The contact hole may be disposed between the neighboring color filters in the column direction among the color filters. One terminal of the capacitor may include the same material as the first and second gate lines, and the other terminal of the capacitor may include the same material as the pixel electrode. The third thin film transistor may be turned on after the first and second thin film transistors are turned on. A light blocking member overlapping a space between the color filters may be further included. A second substrate facing the first substrate may be further included, wherein the light blocking member may be formed on the second substrate. The first and second subpixel electrodes may include a plurality of cutouts, and directions of the edges of the cutouts may be different from each other. The edges of the cutouts may form 45 degree or 135 degree angles with the first and second gate lines.

According to embodiments of the present invention, parasitic capacitance generated between a pixel electrode and a gate line may be decreased such that a kick-back voltage may be minimized. Also, the color filter may be removed (e.g., removed, not formed, or formed to avoid) at a portion where a process deviation may be generated at each pixel such that uniformity of the process is maintained and the aperture ratio may be increased.

DETAILED DESCRIPTION

Figure 1:
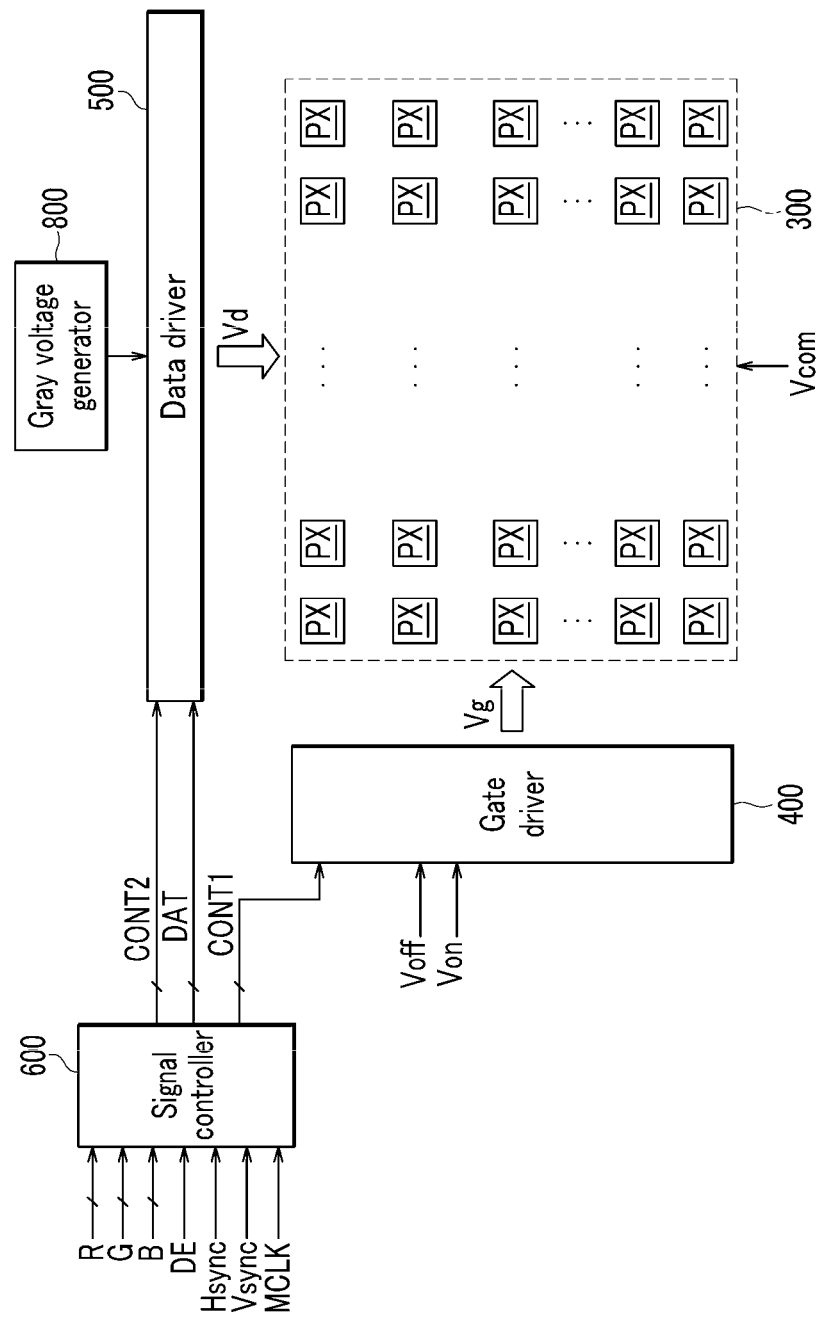
FIG. 1 is a block diagram of a liquid crystal display according to an embodiment of the present invention.

Embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

In the drawings, the thickness, for example, of layers, films, panels, and regions may be exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Figure 2:
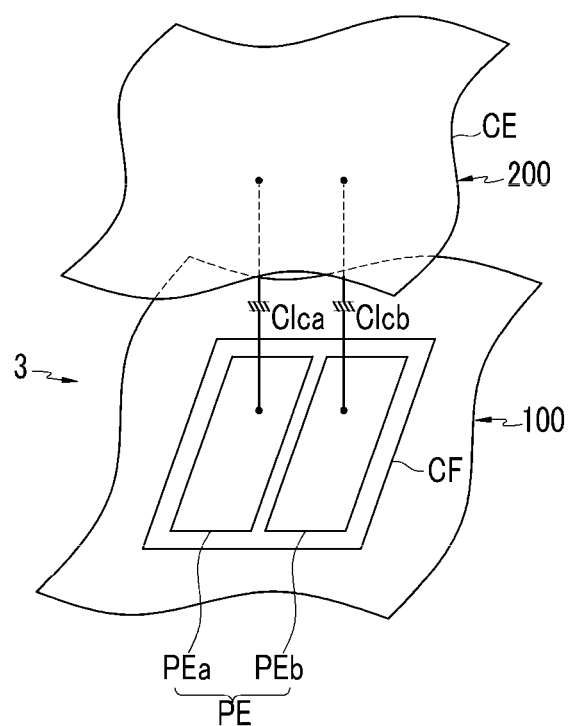
FIG. 2 is an equivalent circuit diagram of two subpixels and a structure of a liquid crystal display according to an embodiment of the present invention.

A liquid crystal display according to an embodiment of the present invention will now be described with reference to FIG. 1 through FIG. 3. FIG. 1 is a block diagram of a liquid crystal display according to an embodiment of the present invention; FIG. 2 is an equivalent circuit diagram of two subpixels and a structure of a liquid crystal display according to an embodiment of the present invention; and FIG. 3 is an equivalent circuit diagram of one pixel of a liquid crystal display according to an embodiment of the present invention.

As shown in FIG. 1, a liquid crystal display according to an embodiment of the present invention includes a liquid crystal panel assembly 300, a gate driver 400, a data driver 500, a gray voltage generator 800, and a signal controller 600.

The liquid crystal panel assembly 300, in a view of an equivalent circuit, includes a plurality of signal lines GLa, GLb, and DL (referring to FIG. 3), and a plurality of pairs of upper and lower pixels PX that are connected thereto and arranged approximately in the form of a matrix. Meanwhile, as seen from the structure of FIG. 2, the liquid crystal panel assembly 300 includes a lower panel 100 and an upper panel 200 facing each other, and a liquid crystal layer 3 interposed between lower panel 100 and upper panel 200.

Figure 3:
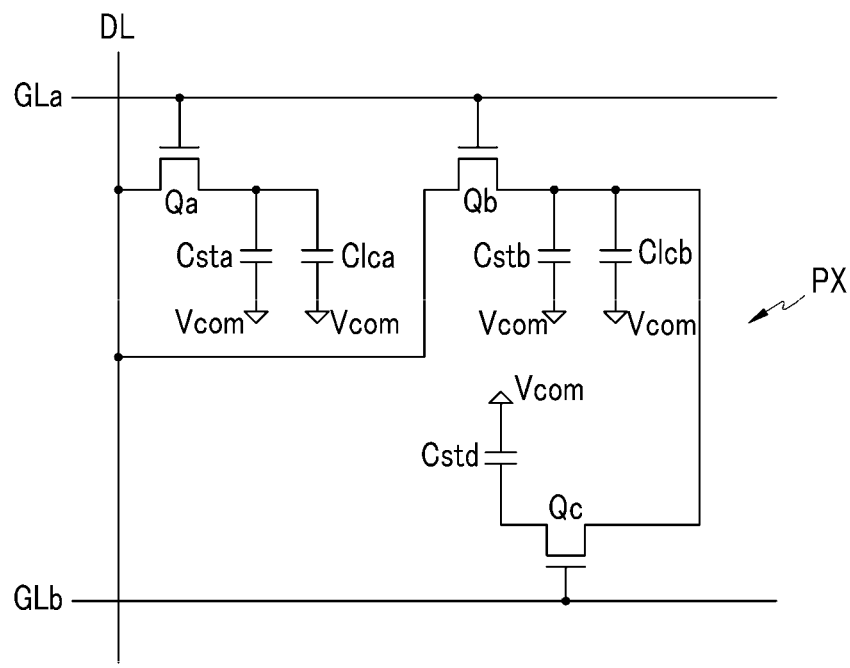
FIG. 3 is an equivalent circuit diagram of one pixel of a liquid crystal display according to an embodiment of the present invention.

Referring to FIG. 3, the signal lines include a plurality of gate lines GLa and GLb transmitting a gate signal (referred to as "scanning signal"), a plurality of data lines DL transmitting a data voltage Vd, and a plurality of storage electrode lines (not shown). The gate lines GLa and GLb extend in an approximate row direction and run substantially parallel to one another, and the data lines DL extend in a column direction and run substantially parallel to each other.

Each of the pixels PX includes a pair of subpixels, and each sub-pixel includes liquid crystal capacitors Clca and Clcb. The two subpixels include switching elements Qa, Qb, and Qc connected to the gate lines GLa and GLb, the data line DL, and the liquid crystal capacitors Clca and Clcb.

The liquid crystal capacitors Clca and Clcb include subpixel electrodes PEa and PEb of the lower display panel 100 and a common electrode CE of the upper display panel 200 as two terminals, respectively, and the liquid crystal layer 3 between the subpixel electrodes PEa and PEb and the common electrode CE serves as a dielectric material. A pair of subpixel electrodes PEa and PEb that are separated from each other form one pixel electrode PE. The common electrode CE is formed on the entire surface of the upper display panel 200, and a common voltage Vcom is applied to the common electrode CE. The liquid crystal layer 3 has negative dielectric anisotropy, and liquid crystal molecules of the liquid crystal layer 3 may be aligned such that their major axes are perpendicular to the surfaces of the two display panels when an electric field is not applied. Differently from FIG. 2, the common electrode CE may be formed on the lower display panel 100, and at least one of the two electrodes PE and CE may have a linear shape or a bar shape.

In order to realize color display, each pixel PX may uniquely display one of the primary colors (spatial division) or each pixel PX may temporally alternate the display of primary colors (temporal division). The primary colors are then spatially or temporally synthesized, and thus a desired color is recognized. Examples of the primary colors may include three primary colors of red, green, and blue. FIG. 2 shows an example of the spatial division. In FIG. 2, each pixel PX has a color filter CF that represents one of the primary colors in a region of the lower display panel 100. Unlike FIG. 2, the color filter CF may be formed in the lower display panel 100.

Polarizers (not shown) for providing light polarization are provided on outer surfaces of the display panels 100 and 200, and the polarization axis of the two polarizers may be crossed. One of the two polarizers may be omitted in the case of a reflective liquid crystal display. In the case of the crossed polarizers, the light incident to the liquid crystal layer 3 is blocked when an electric field is not applied.

Referring again to FIG. 1, the gray voltage generator 800 generates all gray voltages or a predetermined number of the gray voltages (or reference gray voltages) related to transmittance of the pixels PX. The (reference) gray voltages may include one set having a positive value for a common voltage Vcom, and another set having a negative value.

The gate driver 400 is connected to the gate lines GLa and GLb of the liquid crystal panel assembly 300, and applies gate signals obtained by combining (e.g., modulating) a gate-on voltage Von and a gate-off voltage Voff to the gate lines GLa and GLb.

The data driver 500 is connected to the data lines DL of the liquid crystal panel assembly 300, and selects the data signals from the gray voltage generator 800 to apply them to the data lines DL as data voltages. However, when the gray voltage generator 800 does not supply a voltage for all grays but supplies only a predetermined number of reference gray voltages, the data driver 500 may divide the reference gray voltages to select image data signals.

The signal controller 600 controls the gate driver 400 and the data driver 500.

Each of the drivers 400, 500, 600, and 800 may be directly mounted on the liquid crystal panel assembly 300 in the form of at least one IC chip, may be mounted on a flexible printed circuit film (not shown) and then mounted on the liquid crystal panel assembly 300 in the form of a tape carrier package (TCP), or may be mounted on a separate printed circuit board (not shown). Alternatively, the drivers 400, 500, 600, and 800 may be integrated with the liquid crystal panel assembly 300 together with, for example, the signal lines GLa, GLb, and DL and the thin film transistor switching elements Qa, Qb, and Qc. The drivers 400, 500, 600, and 800 may be integrated into a single chip. In this case, at least one of the drivers or at least one circuit forming the drivers may be arranged outside the single chip.

A liquid crystal panel assembly according to an embodiment of the present invention will now be described in detail with reference to FIG. 3 to FIG. 8. Referring to FIG. 3, the liquid crystal panel assembly according to the present embodiment includes signal lines including neighboring first and second gate lines GLa and GLb and a data line DL, and a plurality of pixels PX that are connected to the signal lines.

The pixel PX includes the first, second, and third switching elements Qa, Qb, and Qc, the first and second liquid crystal capacitors Clca and Clcb, and a step-down capacitor Cstd. The first and second switching elements Qa and Qb are respectively connected to the first gate line GLa and the data line DL, and the third switching element Qc is connected to the second gate line GLb.

The first and second switching elements Qa and Qb are three terminal elements such as thin film transistors provided in the lower panel 100, the control terminals of which are connected to one of the first gate lines GLa, the input terminals of which are connected to the data line DL, and the output terminals of which are respectively connected to the first/second liquid crystal capacitors Clca/Clcb and the first/second storage capacitors Csta/Cstb.

The third switching element Qc is also a three terminal element such as a thin film transistor provided in the lower panel 100, the control terminal of which is connected to one of the second gate lines GLb, the input terminal of which is connected to the second liquid crystal capacitor Clcb, and the output terminal of which is connected to the step-down capacitor Cstd.

The first/second storage capacitors Csta/Cstb are connected to the first/second switching elements Qa/Qb and the common voltage Vcom, and function to assist the first/second liquid crystal capacitors Clca/Clcb. The first/second storage capacitors Csta/Cstb are formed by overlapping the storage electrode line of the lower panel 100 and the pixel electrode PE with an insulator interposed therebetween. A predetermined voltage such as the common voltage Vcom is applied to the storage electrode signal line. The first and second storage capacitors Csta and Cstb may be omitted, if necessary.

The step-down capacitor Cstd is connected to the output terminal of the third switching element Qc and the common voltage Vcom. The step-down capacitor Cstd is formed by overlapping a capacitive electrode line (not shown) provided in the lower panel 100 and the output electrode of the third switching element Qc via the insulator therebetween, and the capacitive electrode line is applied with a predetermined voltage such as the common voltage Vcom.

Figure 4:
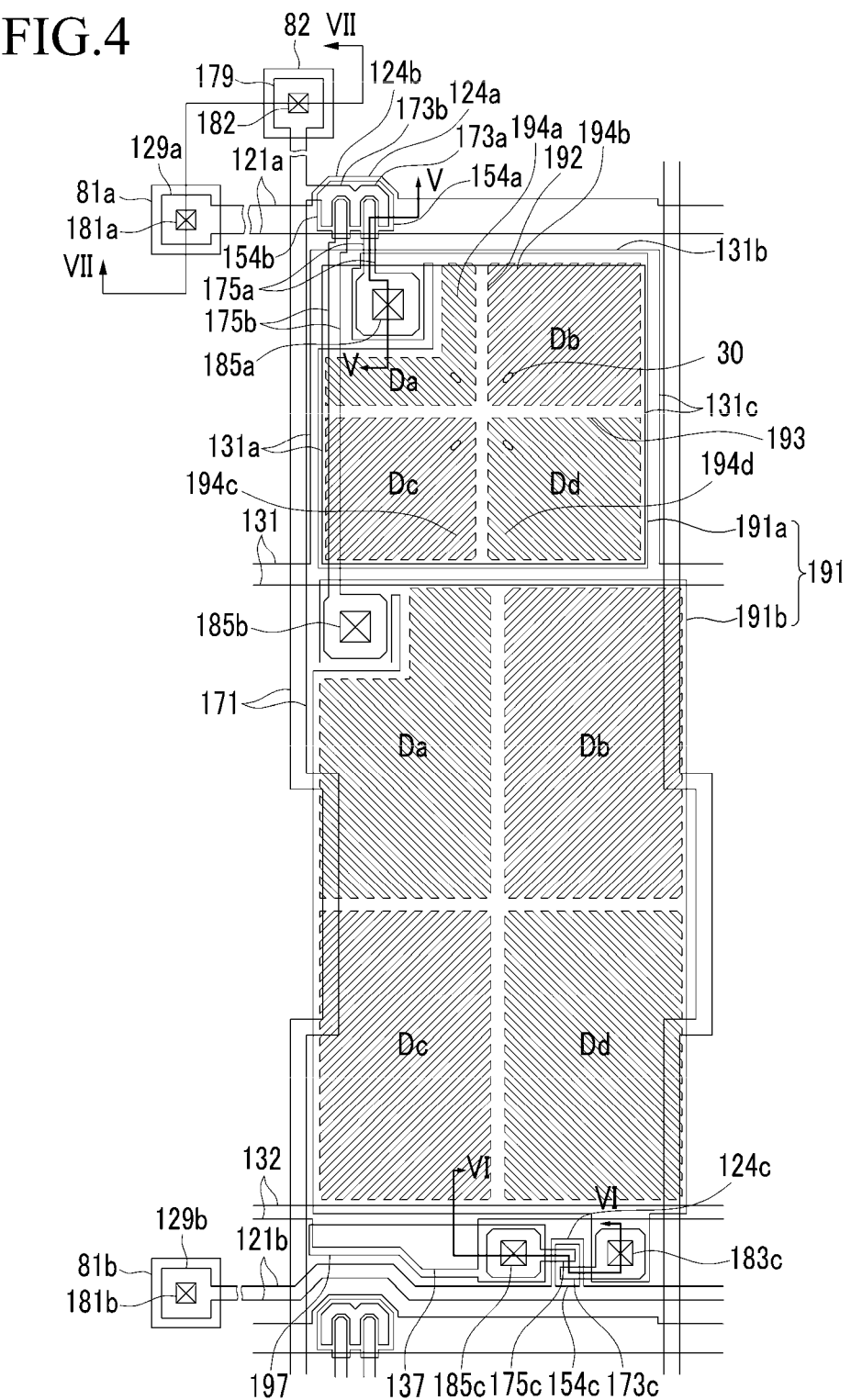
FIG. 4 is a layout view of a liquid crystal panel assembly according to an embodiment of the present invention.
Figure 5:
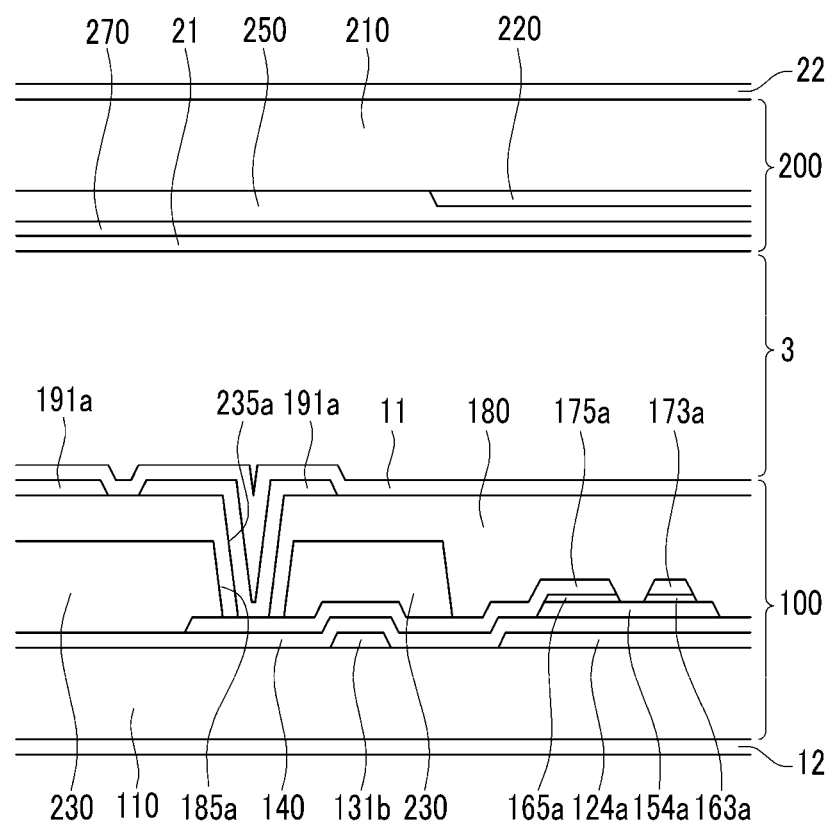
FIG. 5, FIG. 6, and FIG. 7 are cross-sectional views of the liquid crystal panel assembly shown in FIG. 4 taken along the lines V-V, VI-VI, and VII-VII, respectively, in accordance with one or more embodiments of the present invention.
Figure 6:
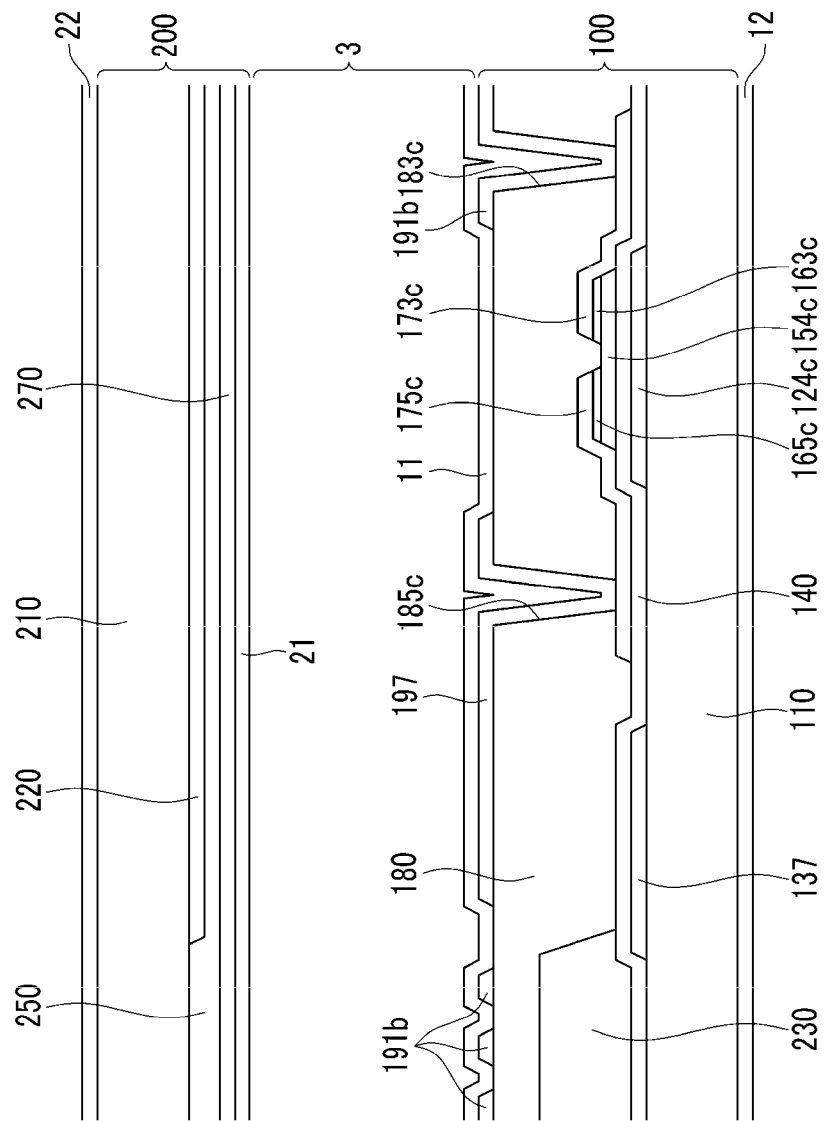
Figure 7:
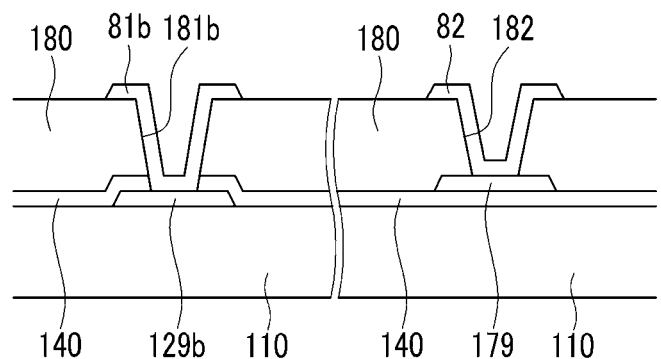

The liquid crystal panel assembly according to an embodiment of the present invention will now be described in detail with reference to FIG. 4 to FIG. 7. FIG. 4 is a layout view of a liquid crystal panel assembly according to an embodiment of the present invention, and FIG. 5, FIG. 6, and FIG. 7 are cross-sectional views of the liquid crystal panel assembly shown in FIG. 4 taken along the lines V-V, VI-VI, and VII-VII, respectively, in accordance with one or more embodiments.

A liquid crystal display according to the present embodiment includes the lower panel 100 and the upper panel 200 facing each other, the liquid crystal layer 3 disposed between the two display panels 100 and 200, and a pair of polarizers 12 and 22 attached on the outside surfaces, respectively, of the display panels 100 and 200.

Firstly, the lower panel 100 will be described.

A plurality of gate conductors including a plurality of first and second gate lines 121a and 121b, a plurality of storage electrode lines 131, and capacitive electrode lines 132 are formed on an insulation substrate 110. The first gate line 121a include first and second gate electrodes 124a and 124b, and an end portion 129a, and the second gate line 121b includes a third gate electrode 124c and an end portion 129b.

The storage electrode line 131 includes a first storage electrode 131a extending vertically (e.g., orthogonally) to the first and second gate lines 121a and 121b, a second storage electrode 131b extending parallel to the first and second gate lines 121a and 121b, and a third storage electrode 131c extending vertically (e.g., orthogonally) to the first and second gate lines 121a and 121b. The capacitive electrode line 132 includes a first capacitive electrode 137 extending downward (e.g., orthogonally to the first and second gate lines 121a and 121b) with a wide area.

A gate insulating layer 140 is formed on the gate conductors 121a, 121b, 131, and 132. First, second, and third semiconductor islands 154a, 154b, and 154c are formed on the gate insulating layer 140, and a plurality of the first ohmic contacts 163a and 165a, second ohmic contacts (not shown), and third ohmic contacts 163c and 165c are formed thereon.

A data conductor including a plurality of data lines 171, a plurality of first, second, and third drain electrodes 175a, 175b, and 175c, and an electrode member 173c are formed on the first ohmic contacts 163a and 165a, the second ohmic contacts (not shown), and the third ohmic contacts 163c and 165c, and on the gate insulating layer 140. Each data line 171 includes a plurality of first and second source electrodes 173a and 173b, and an end portion 179 having a large area for contact with another layer or an external driving circuit. An electrode member 173c forms the third source electrode.

The first, second, and third drain electrodes 175a, 175b, and 175c include one end portion with a wide area and the other end portion of a bar type. The bar end portions of the first/second drain electrodes 175a/175b are enclosed by the first/second source electrodes 173a/173b. The bar end portion of the third drain electrode 175c is opposite to the third source electrode 173c.

The first/second/third gate electrodes 124a/124b/124c, the first/second/third source electrodes 173a/173b/173c and the first/second/third drain electrodes 175a/175b/175c form the first/second/third thin film transistors (TFT) Qa/Qb/Qc along with the first/second/third semiconductor islands 154a/154b/154c, and the channels of the thin film transistors are respectively formed in the semiconductor islands 154a/154b/154c between the source electrodes 173a/173b/173c and the drain electrodes 175a/175b/175c.

A plurality of color filters 230 are formed on the data conductors 171, 175a, 175b, 175c, and 173c and exposed portion of the semiconductor islands 154a, 154b, and 154c. Each of the color filters 230 may display one of the primary colors such as the three primary colors of red, green, and blue. The color filters 230 may be made of a photosensitive organic material including pigments. The color filters 230 may have first and second through holes 235a and 235b.

A passivation layer 180 is formed on the color filters 230. The passivation layer 180 may be made of an inorganic insulator or an organic insulator, and may have a flat surface. Examples of the inorganic insulator may be silicon nitride and silicon oxide. The organic insulator may have photosensitivity, and the dielectric constant thereof may be established to be about 4.0 or less. Alternatively, the passivation layer 180 may have a dual-layer structure of a lower inorganic layer and an upper organic layer such that it does no harm to the exposed portions of the semiconductors 154a and 154b while exerting the excellent insulating characteristics of an organic layer, and may be omitted if necessary.

The passivation layer 180 has a plurality of contact holes 182, 183c, 185a, 185b, and 185c respectively exposing the end portions 179 of the data lines 171, the wide end portions of the third source electrode 173c, the wide end portions of the first drain electrodes 175a, the wide end portions of the second drain electrode 175b, and the wide end portions of the third drain electrodes 175c, and the passivation layer 180 and the gate insulating layer 140 have a plurality of contact holes 181a and 181b respectively exposing the end portions 129a and 129b of the gate lines 121a and 121b. The contact holes 185a and 185b accord with the positions and the shapes of the through holes 235a and 235b of the color filters 230.

A plurality of pixel electrodes 191 including first and second subpixel electrodes 191a and 191b, a second capacitive electrode 197, and a plurality of contact assistants 81a, 81b, and 82 are formed on the passivation layer 180.

The first and second subpixel electrodes 191a and 191b are adjacent to each other in the column direction, and the first and second subpixel electrodes 191a and 191b respectively include a transverse stem 193, a longitudinal stem 192 intersecting the transverse stem 193, and a plurality of first to fourth cutouts 194a, 194b, 194c, and 194d. Also, the first and second subpixel electrodes 191a and 191b are divided into a first subregion Da, a second subregion Db, a third subregion Dc, and a fourth subregion Dd by the transverse stem 193 and the longitudinal stem 192, and the subregions Da-Dd respectively include the plurality of first, second, third, and fourth cutouts 194a, 194b, 194c, and 194d.

The first cutout 194a obliquely extends from the transverse stem 193 or the longitudinal stem 192 in the upper-left direction, and the second cutout 194b obliquely extends from the transverse stem 193 or the longitudinal stem 192 in the upper-right direction. Also, the third cutout 194c obliquely extends from the transverse stem 193 or the longitudinal stem 192 in the lower-left direction, and the fourth cutout 194d obliquely extends from the transverse stem 193 or the longitudinal stem 192 in the lower-right direction.

The first to fourth cutouts 194a-194d form an angle of about 45 degrees or 135 degrees with the gate lines 121 or the transverse stem 193. Also, the cutouts 194a-194d of two neighboring sub-regions Da-Dd may be perpendicular to each other.

The first/second subpixel electrodes 191a/191b are connected to the first/second drain electrodes 175a/175b through the first/second contact holes 185a/185b and receive data voltages Vd from the first/second drain electrodes 175a/175b. The first/second subpixel electrodes 191a/191b, with the data voltages Vd applied, and the common electrode 270 of the common electrode panel 200 generate an electric field that determines the orientations of liquid crystal molecules of the liquid crystal layer 3 between the two electrodes 191 and 270. Accordingly, the luminance of the light transmitted through the liquid crystal layer 3 differs depending on the thusly determined orientation of the liquid crystal molecules.

The edges of the first to fourth cutouts 194a-194d distort the electric field, and form a horizontal component that determines an inclined direction of liquid crystal molecules of liquid crystal layer 3. The horizontal component of the electric field is almost parallel to the edges the first to fourth cutouts 194a-194d. Accordingly, liquid crystal molecules of liquid crystal layer 3 may be inclined in the direction parallel to the lengthwise direction of the minute cutouts 194a-194d. In an embodiment of the present invention, one pixel PX includes four subregions Da-Dd where the lengthwise directions of the cutouts 194a-194d are extended in all four directions such that the inclined directions of the liquid crystal molecules 30 include all four directions. Therefore, the viewing angle of the liquid crystal display is widened by varying the inclined directions of the liquid crystal molecules.

In addition, the second subpixel electrode 191b is physically and electrically connected to the third source electrode 173c through the contact hole 185c. The first gate line 121a and the second gate line 121b are disposed between a plurality of pixel electrodes 191 that are neighboring in the column direction, and all of the first and second gate lines 121a and 121b do not overlap the pixel electrodes 191.

In addition, if the gate-on voltage is applied to the gate line 121, the thin film transistor Q connected thereto is turned on. Accordingly, during the time that the gate-on voltage is applied to the gate line 121, the data voltages applied to the data line 171 are transmitted to the pixel electrode 191 through the thin film transistor Q that is turned on thereby to be represented as a pixel electrode voltage. Next, when changing from a gate-on voltage to a gate-off voltage, a pixel electrode voltage drops slightly by a predetermined degree that is referred to as a kick-back voltage $\Delta Vk$. The kick-back voltage $\Delta Vk$ may be represented by the following equation.

$$\Delta Vk = \frac{Cgd}{Clc + Cst + Cgd} \times \Delta Vg$$

Here, Clc is capacitance of the liquid crystal capacitor, Cst is capacitance of the storage capacitor, Cgd is a parasitic capacitance between the gate electrodes 124a, 124b, and 124c, and other electrodes such as the drain electrodes 175a, 175b, and 175c or the pixel electrode 191, and $\Delta Vg$ is a difference between the gate-on voltage and the gate-off voltage. Accordingly, the kick back voltage $\Delta Vk$ is increased as the parasitic capacitance between the first to third gate electrodes 124a, 124b, and 124c and the pixel electrode 191 is increased. According to embodiments of the present invention, all of the first and second gate lines 121a and 121b do not overlap the pixel electrodes 191 such that the parasitic capacitance between the first to third gate electrodes 124a, 124b, and 124c and the pixel electrode 191 is small, thereby reducing the kick-back voltage $\Delta Vk$.

The second capacitive electrode 197 overlaps the first capacitive electrode 137, and is physically and electrically connected to the third drain electrode 175c through the contact hole 185c. The first capacitive electrode 137 and the second capacitive electrode 197 are overlapped with each other via the passivation layer 180 and the gate insulating layer 140, thereby forming the step-down capacitor Cstd.

The contact assistants 81a, 81b, and 82 are connected to the end portions 129a and 129b of the gate lines 121a and 121b and the end portions 179 of the data lines 171 through the contact holes 181a, 181b, and 182, respectively. The contact assistants 81a, 81b, and 82 may enhance adhesion of the end portions 129a and 129b of the gate lines 121a and 121b and the end portions 179 of the data lines 171 to external devices, and protect them. An alignment layer 11 may be formed on the pixel electrodes 191 and the contact assistants 81a, 81b, and 82.

Now, the upper panel 200 will be described.

A light blocking member 220 is formed on an insulation substrate 210. The light blocking member 220 is referred to as a black matrix, and prevents light leakage. An overcoat 250 is formed on the light blocking member 220. A common electrode 270 is formed on the overcoat 250. An alignment layer 21 is formed on the common electrode 270.

The liquid crystal layer 3 has negative dielectric anisotropy, and the liquid crystal molecules of the liquid crystal layer 3 may be aligned so that a major axis thereof is perpendicular to the surface of the two display panels in the absence of an electric field.

Figure 8:
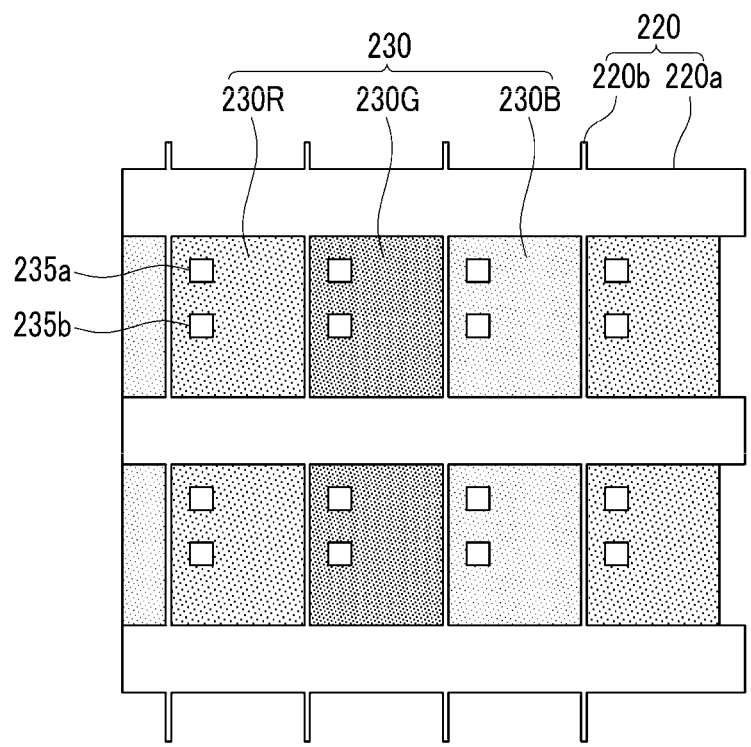
FIG. 8 is a layout view of color filters in a liquid crystal display according to an embodiment of the present invention.

Next, a color filter according to an embodiment of the present invention will be described with reference to FIG. 8 and the above-described FIG. 4 to FIG. 6. FIG. 8 is a layout view of a color filter and a light blocking member in a liquid crystal display according to an embodiment of the present invention.

Referring to FIG. 8, the color filters 230 include red color filters 230R, green color filters 230G, and blue color filters 230B; the color filters 230R, 230G, and 230B having different colors are arranged in the row direction; and color filters 230R, 230G, and 230B having the same color are arranged in the column direction. Each color filter 230 is disposed with an island shape in a region enclosed by the first gate line 121a and the second gate line 121b, and between two data lines 171.

The light blocking member 220 is formed between the color filters 230. In other words, the light blocking member 220 is formed in a region where the first gate lines 121a, the second gate lines 121b, and the data lines 171 exist. The light blocking member 220 includes a transverse portion 220a overlapping the first and second gate lines 121a and 121b, and a longitudinal portion 220b overlapping the data lines 171. Accordingly, the color filters 230 are presented in the region enclosed by the transverse portion 220a and the longitudinal portion 220b of the light blocking member 220.

If the color filters 230 overlap the transverse portion 220a of the light blocking member 220, that is, the first and second gate lines 121a and 121b, and the capacitive electrode lines 132 overlap each other, the color filter 230 must have an opening on the portion where the first capacitive electrode 137 and the second capacitive electrode 197 are overlapped with each other to obtain the capacitance of the step-down capacitor Cstd. Also, to obtain the path of the contact holes 183c and 185c, the color filters 230 must include a through hole. In this case, to match the capacitance of the step-down capacitor Cstd between the pixels having the different color filters 230R, 230G, and 230B, it might be required that the openings formed in the different color filters 230R, 230G, and 230B are formed with the same size. However, three color filters 230R, 230G, and 230B are made of different materials such that a process deviation may be generated when forming the opening, and it is difficult to match the capacitance of the step-down capacitor Cstd between the pixels having the different color filters 230R, 230G, and 230B. Also, when forming the through hole in the color filters 230 to form the contact holes 183c and 185c, the area of the region corresponding to the transverse portion 220a of the light blocking member 220 might be increased to obtain the size of the through hole, thus, decreasing the aperture ratio of the liquid crystal display. According to an embodiment of the present invention, however, the color filters 230 do not exist in (e.g., are formed to avoid) the region corresponding to the transverse portion 220a of the light blocking member 220 such that it is not necessary to form the opening overlapping the first capacitive electrode 137 and the second capacitive electrode 197 in the color filters 230. Accordingly, for an embodiment, there is no concern with process deviation for forming openings in each of the color filters 230R, 230G, and 230B. Also, for an embodiment, it is not necessary to form the through hole for the path of the contact holes 183c and 185c in the color filters 230 such that it is not necessary to increase the area of the region corresponding to the transverse portion 220a of the light blocking member 220, thereby relatively increasing the aperture ratio of the liquid crystal display.

The operation of the LCD according to one embodiment of the present invention will be described hereinafter with reference to FIG. 1 through FIG. 3.

The signal controller 600 receives input image signals R, G, and B and input control signals for controlling the display from an external graphics controller (not shown). The input image signals R, G, and B involve luminance information of each pixel PX, and the luminance has a predetermined number of grays, for example $1024=2^{10}$, $256=2^8$, or $64=2^6$ grays. Examples of the input control signals are a vertical synchronization signal Vsync, a horizontal synchronizing signal Hsync, a main clock signal MCLK, and a data enable signal DE.

The signal controller 600 appropriately processes the input image signals R, G, and B to match operating conditions of the liquid crystal panel assembly 300 based on the input image signals R, G, and B and the input control signals. Moreover, the signal controller 600 generates a gate control signal CONT1 and a data control signal CONT2, sends the gate control signal CONT1 to the gate driver 400, and sends the data control signal CONT2 and the processed image signal DAT to the data driver 500. The output image signal DAT as a digital signal has a value (or gray) of a predetermined number.

The data driver 500 receives the digital image signal DAT for the pixel PX of one row according to the data control signal CONT2 generated by the signal controller 600, and selects a gray voltage corresponding to each digital image signal DAT. Then, the data driver 500 converts the digital image signal DAT into an analog data voltage to apply the converted digital image signal to a relevant data line DL.

The gate driver 400 applies a gate-on voltage Von to the gate lines GLa and GLb according to the gate control signal CONT1 generated by the signal controller 600 to turn on the switching elements Qa, Qb, and Qc connected to the gate lines GLa and GLb. In this case, a data voltage Vd applied to the data line DL is applied to the relevant pixel PX through the turned-on first and second switching elements Qa and Qb.

A specific pixel row, for example focusing on the i-th pixel row, will be described below.

The first gate signal is applied to the first gate line GLa of the i-th row, and the second gate line GLb is applied with the second gate signal. If the first gate signal is changed from the gate-off voltage Voff to the gate-on voltage Von, the first and second switching elements Qa and Qb connected thereto are turned on. Accordingly, the data voltage Vd applied to the data line DL is applied to the first and second subpixel electrodes PEa and PEb through the turned-on first and second switching elements Qa and Qb. Here, the same data voltage Vd is applied to the first and second subpixel electrodes PEa and PEb. The first and second liquid crystal capacitors Clca and Clcb are charged with the same value as a difference between the common voltage and the data voltage Vd.

Then, when the first gate signal is changed to the gate-off voltage Voff from the gate-on voltage Von and at the same time the second gate signal is changed to the gate-on voltage Von from the gate-off voltage Voff, the first and second switching elements Qa and Qb are turned off and the third switching element Qc is turned on. Then, electrical charges move from the second subpixel electrode PEb to the third drain electrode 175c through the third switching element Qc. For this reason, the charging voltage of the second liquid crystal capacitor Clcb is lowered, and the step-down capacitor Cstd is charged with electricity. The charging voltage of the second liquid crystal capacitor Clcb is decreased by the capacitance of the step-down capacitor Cstd such that the charging voltage of the second liquid crystal capacitor Clcb is lower than the changing voltage of the first liquid crystal capacitor Clca.

At this time, the charging voltages of the two liquid crystal capacitors Clca and Clcb show different gamma curves, and the gamma curve of one pixel voltage is a curved line that is synthesized from these different gamma curves. The synthetic gamma curve in the front should be corrected so as to conform to the most suitable reference gamma curve in the front, and the synthetic gamma curve in the side should be corrected so as to be extremely close to the reference gamma curve in the front. As described above, due to conversion of the image data, side visibility is improved.

By repeating the above procedure by a unit of one horizontal period which is denoted by "1H" and is equal to one period of a horizontal synchronizing signal Hsync and a data enable signal DE, a data voltage Vd is applied to all pixels PX to display an image of one frame.

When the next frame starts after finishing one frame, the state of an inversion signal RVS applied to the data driver 500 is controlled such that the polarity of the data voltage Vd applied to each pixel PX is opposite to that of the previous frame.

While embodiments of this invention have been described in connection with what are presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
   a substrate;
   a first gate line and a second gate line disposed on the substrate;
   a capacitive electrode line extended substantially parallel to the first gate line and the second gate line;
   a data line intersecting the first gate line and the second gate line;
   a first pixel electrode including a first sub pixel electrode and a second sub pixel electrode, and a second pixel electrode disposed on the substrate;
   a first thin film transistor comprising a first terminal connected to the first gate line, a second terminal connected to the data line, and a third terminal connected to the first sub pixel electrode;
   a second thin film transistor comprising a first terminal connected to the first gate line, a second terminal connected to the data line, and a third terminal connected to the second sub pixel electrode;
   a third thin film transistor comprising a first terminal connected to the second gate line, a second terminal connected to the second sub pixel electrode, and a third terminal connected to the capacitive electrode line; and
   a third gate line connected to the second pixel electrode,
   wherein the second gate line, the capacitive electrode line, and the third gate line are disposed between the first pixel electrode and the second pixel electrode and separated from the second gate line.

2. The liquid crystal display of claim 1, wherein the second gate line is disposed between the third gate line and the capacitive electrode line.

3. The liquid crystal display of claim 1, wherein a voltage of the second sub pixel electrode is lower than a voltage of the first sub pixel electrode.

4. The liquid crystal display of claim 3, wherein the second sub pixel electrode is adjacent to the capacitive electrode line.

5. The liquid crystal display of claim 3, wherein the first sub pixel electrode is adjacent to the first gate line.

6. The liquid crystal display of claim 3, wherein the third thin film transistor is turned on after the first and second thin film transistors are turned on.

7. A liquid crystal display, comprising:
   a substrate;
   a plurality of first gate lines and a plurality of second gate lines disposed on the substrate;
   a plurality of capacitive electrode lines extended substantially parallel to the first gate line and the second gate line;
   a plurality of data lines intersecting the gate line;
   a plurality of first sub pixel electrodes and a plurality of second sub pixel electrodes disposed on the substrate;
   a first thin film transistor comprising a first terminal connected to the first gate line, a second terminal connected to the data line, and a third terminal connected to the first sub pixel electrode;
   a second thin film transistor comprising a first terminal connected to the first gate line, a second terminal connected to the data line, and a third terminal connected to the second sub pixel electrode; and
   a third thin film transistor comprising a first terminal connected to the second gate line, a second terminal connected to the second sub pixel electrode, and a third terminal connected to the capacitive electrode line,
   wherein the capacitive electrode line is disposed between the second sub pixel electrode and the second gate line, and
   wherein the second gate line is not connected to a thin film transistor disposed on an adjacent pixel row.

8. The liquid crystal display of claim 7, wherein a voltage of the second sub pixel electrode is lower than a voltage of the first pixel electrode.

9. The liquid crystal display of claim 8, wherein the first sub pixel electrode is adjacent to the first gate line.

10. The liquid crystal display of claim 8, wherein the third thin film transistor is turned on after the first and second thin film transistors are turned on.

11. The liquid crystal display of claim 7, wherein the first gate line, the second gate line, and the capacitive electrode line are adjacent to one another, and
   the second gate line is disposed between the first gate line and the capacitive electrode line.

* * * * *